3,004,972
1-PHENYL-2-ALKYL-4-AMINO-3:6 DIOXO-
1:2:3:6-TETRAHYDROPYRIDAZINES
Jean Druey, Riehen, and Konrad Meier and Alexander
Staehelin, Basel, Switzerland, assignors to Ciba Pharmaceutical Products Inc., Summit, N.J.
No Drawing. Filed Mar. 3, 1958, Ser. No. 718,408
Claims priority, application Switzerland Mar. 29, 1957
11 Claims. (Cl. 260—250)

This invention relates to new pyridazine compounds. More particularly it concerns 1-aryl-3:6-dioxo-1:2:3:6-tetrahydropyridazines, which contain in the 2-position a lower aliphatic hydrocarbon radical and in the 4-position an amino group, and salts and quaternary ammonium compounds thereof. As aryl radicals there may be mentioned more especially at most binuclear aromatic radicals, preferably phenyl, which may contain substituents, for example, lower alkyl or lower alkoxy groups, halogen atoms such as chlorine, bromine, iodine or fluorine, nitro or amino groups. The lower aliphatic hydrocarbon radicals are preferably lower alkyl groups, such as methyl or ethyl. The amino groups may be unsubstituted or substituted, for example, by lower aliphatic hydrocarbon radicals, such as lower alkyl, alkylene or cycloalkyl radicals, which may be substituted or interrupted by heteroatoms, such as nitrogen, oxygen or sulphur. Such radicals are, for example, methyl ethyl, propyl, butyl, cyclopentyl, cyclohexyl, butylene-(1:4), pentylene-(1:5), 3-oxa-pentylene-(1:5), 3-aza-pentylene-(1:5), hydroxy-lower alkyl, such as β-hydroxyethyl, di-lower alkylamino-lower alkyl, such as β-dimethyl- or diethylaminoethyl, etc. Preferably the amino group is disubstituted by the radicals mentioned above, and is a dilower-alkyl-amino group, for example, a dimethylamino or diethylamino group, or a pyrrolidino, piperidino, morpholino or piperazino group.

The new dioxo-pyridazines may contain in the 5-position a further substituent, advantageously a lower aliphatic hydrocarbon radical such as a lower alkyl group.

As quaternary ammonium compounds there may be mentioned more especially lower alkyl-amonium or benzyl-ammonium compounds.

The new compounds have an antipyretic and analgesic effect. Compounds of this type also show sedative-hypnotic activity. The new pyridazines are therefore useful as medicaments. Especially valuable, and therefore representing a specific and preferred embodiment of the invention are dioxo-pyridazines of the formula

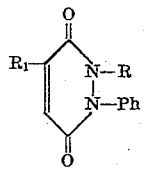

in which R represents a methyl or ethyl group, R₁ represents a di-lower-alkyl-amino group or a pyrrolidino, piperidino, morpholino or piperazino group, and Ph represents a phenyl radical, and salts of these compounds. In particular there may be mentioned 1-phenyl-2-methyl-4-dimethylamino-3:6-dioxo-1:2:3:6:-tetrahydropyridazine. Compounds with a sedative-hypnotic action are especially 1-para - chlorophenyl-2-methyl-4-dimethylamino-3:6-dioxo-1:2:3:6-tetrahydropyridazine of the formula

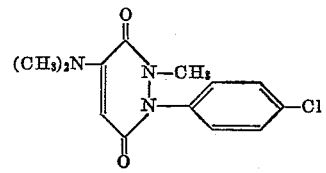

1-phenyl-2-ethyl-4-dimethylamino - 3:6 - dioxo-1:2:3:6-tetrahydropyridazine and 1-phenyl-2-ethyl-4-pyrrolidino-3:6-dioxo-1:2:3:6-tetrahydropyridazine and salts thereof.

The new compounds can be obtained when a 1-aryl-3:6-dioxo-1:2:3:6-tetrahydro-pyridazine, which contains in the 2-position a lower aliphatic hydrocarbon radical and in the 4- or 5-position an exchangeable substituent, for example, a reactive esterified hydroxyl group, especially a halogen atom such as chlorine or bromine, is treated with ammonia or an amine containing at least one hydrogen atom bound to nitrogen. In this reaction the amine radical enters the 4-position irrespective of the position of the halogen atom.

The 1-aryl-4- or -5-halogen-3:6-dioxo-1:2:3:6-tetrahydropyrdiazines, which contain in the 2-position a lower aliphatic hydrocarbon radical, used as starting materials, are new. They can be obtained by introducing a lower aliphatic hydrocarbon radical into the 2-position of the appropriate 2-unsubstituted compound, for example, by treating the 2-unsubstituted compound with an appropriate sulfuric acid diester and isolating the 2-substituted product so formed. Mono-halogen-compounds of this kind can also be unexpectedly obtained from the appropriate 1-aryl-4:5-di-halogeno-3:6-dioxo-1:2:3:4:5:6-hexahydropyridazines which contain at least one hydrogen atom in the 4- and 5-positions and contain a lower aliphatic hydrocarbon radical in the 2-position, by reacting the appropriate compound with an agent capable of eliminating hydrogen halide, advantageously a strong organic base, for example, a tertiary amine, especially pyridine. When ammonia or a primary or secondary amine is used the halogen atom which remains can be exchanged for an amino group in the same operation.

1-aryl-4:5-dihalogeno-3:6-dioxo - 1:2:3:4:5:6-hexahydropyridazines, which contain in the 2-position a lower aliphatic hydrocarbon radical, are new. They can be obtained by the additive combination of halogen with an appropriate 1-aryl-3:6-dioxo-1:2:3:6-tetrahydropyridazine.

The preparation of these starting materials forms the subject of our copending application Serial No. 718,417 of even date herewith and now Patent No. 2,934,536. The other starting materials are known or can be made by methods in themselves known.

The starting materials used in the process may also be formed under the reaction conditions. Thus, for example, a 4,5-dihalogeno-1-aryl-3:6-dioxo-1:2:3:4:5:6-hexahydropyridazine, which contains in the 2-position a lower aliphatic hydrocarbon radical, may be reacted with ammonia or an amine as described above, whereby the corresponding mono-halogeno-3:6-dioxo-1:2:3:6-tetrahydropyridazine is first formed by the elimination of hydrogen halide and then reacts with ammonia or the amine in the manner indicated above.

In the compounds obtained according to the process substituents in the aryl radical may be converted in any manner. For example, a nitro group can be reduced to the amino group in the customary way. The 4-amino-1-aryl-3:6-dioxo-1:2:3:6-tetrahydro-pyridazines are obtained in the form of the free bases or salts thereof depending on the method of preparation. The free bases may be converted into therapeutically useful acid addition salts thereof or the salts into the free bases by the usual methods. As therapeutically useful acid addition salts there may be mentioned more especially those of hydrohalic acid, sulfuric acid, nitric acid, phosphoric acid, thiocyanic acid, acetic acid, propionic acid, oxalic acid, malic acid, citric acid, tartaric acid, benzoic acid, methane sulfonic acid, ethane sulfonic acid, oxyethane sulfonic acid, benzene sulfonic acid, salicylic acid, para-aminosalicylic acid or toluene sulfonic acid. The free bases may be converted into quaternary ammonium salts by reaction with reactive esters of alcohols, especially lower alkanols or benzyl alcohols. Reactive esters are especially those of hydrohalic acids, sulfuric acid or aromatic sulfonic acids such as para-toluene sulfonic acid. Quaternary salts may be converted in the usual manner into ammonium hydroxides, from which quaternary salts can be obtained in known manner, for example, quaternary salts of the aforesaid acids. The quaternary salts so obtained may also be converted directly into other salts, for example, by double decomposition with appropriate salts or with anion exchangers.

The new 4-amino-1-aryl-3:6-dioxo-1:2:3:6-tetrahydropyridazines and their salts and quaternary ammonium compounds may be used, for example, in the form of pharmaceutical preparations which contain the active compound in admixture with a pharmaceutical organic or inorganic carrier suitable for enteral, parenteral or topical administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves, creams, or in liquid form as solutions, suspensions or emulsions. If desired, they may be sterilized and/or may contain auxiliary substances such as preserving, stabilizing, wetting or emulsifying agents, salts for regulating the osmotic pressure or buffers. They may also contain other therapeutically valuable substances, for example, antibacterial or antivirus substances.

The following examples illustrate the invention:

*Example 1*

10 grams of 1-phenyl-2-methyl-4:5-dibromo-3:6-dioxo-1:2:3:4:5:6-hexahydropyridazine are dissolved in 50 cc. of chloroform, and a solution of 7.2 grams of morpholine in 20 cc. of chloroform is added. The reaction sets in immediately. After allowing the mixture to stand for 12 hours it is washed with dilute hydrochloric acid. The chloroform solution is dried and the chloroform is completely evaporated. The residue is recrystallized from absolute ethanol. There is obtained 1-phenyl-2-methyl-4-morpholino-3:6-dioxo-1:2:3:6-tetrahydro-pyradazine of the formula

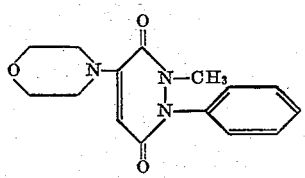

in the form of white crystals melting at 176–177.5° C.

The dihalogen-dioxo-hexahydropyridazine used as starting materials may be prepared as follows:

50 grams of 1-phenyl-2-methyl-3:6-dioxo-1:2:3:6-tetrahydropyridazine are dissolved in the warm in 100 cc. of glacial acetic acid, and a solution of 39 grams of bromine in 50 cc. of glacial acetic acid is added. The brown solution is heated at the boil for a short time, during which it loses its color. It is allowed to stand first for 3 hours at room temperature and then for a little time at 0° C., whereby 1-phenyl-2-methyl-4:5-dibromo-1:2:3:4:5:6-tetrahydro-pyridazine of the formula

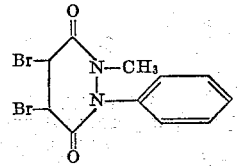

precipitates in the form of white crystals. After recrystallization from ethanol the product melts at 177–178.5° C. with decomposition.

*Example 2*

10 grams of 1-phenyl-2-methyl-5-chloro-3:6-dioxo-1:2:3:6-tetrahydropyridazine dissolved in 80 cc. of acetone are heated at the boil for ½ hour with a solution of 7.4 grams of morpholine in 20 cc. of acetone. In a short time a part of the morpholine hydrochloride crystallises out. The acetone solution is evaporated to remove the solvent as far as possible, a small amount of water is added, and the whole is heated until dissolution is complete. Upon cooling the reddish solution white lamellae crystallise out, which can be recrystallized from methanol. In this manner there is obtained the 1-phenyl-2-methyl - 4 - morpholino - 3:6 - dioxo - 1:2:3:6 - tetrahydropyridazine described in Example 1.

The 1 - phenyl-2-methyl-5-chloro-3:6-dioxo-1:2:3:6-tetrahydropyridazine used as starting material may be prepared as follows:

5 grams of 1-phenyl-5-chloro-3:6-dioxo-1:2:3:6-tetrahydropyridazine are heated with 20 cc. of dimethyl sulfate for 3½ hours at 120–130° C. The light brown solution is cooled and poured into a saturated solution of sodium carbonate (about 150 cc.). After allowing the mixture to stand for 2 days, the alkaline solution is extracted with chloroform. The chloroform solution is dried, filtered through animal charcoal and evaporated. The pale yellow crystalline residue is recrystallized from methanol. There is obtained 1-phenyl-2-methyl-5-chloro-3:6-dioxo-1:2:3:6-tetrahydropyridazine of the formula

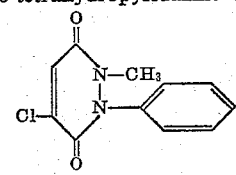

in the form of yellow-white crystals melting at 156–157.5° C.

*Example 3*

15 grams of 1-phenyl-2-methyl-5-bromo-3:6-dioxo-1:2:3:6-tetrahydropyridazine are heated with 15.5 grams of diethylamine in 150 cc. of absolute ethanol for 10 hours at the boil. The solvent is completely evaporated from the reddish solution, and water is added to the solution and the whole is extracted with ether. The ethereal solution is dried and the solvent is completely evaporated. The crystalline residue is recrystallized from a mixture of benzene and petroleum ether. There is obtained 1-phenyl - 2 - methyl-4-diethylamino-3:6-dioxo-1:2:3:6-tetrahydropyridazine of the formula

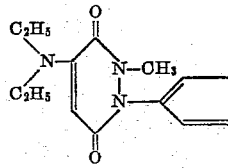

in the form of white crystals melting at 115.5–116.5° C.

The 1 - phenyl-2-methyl-5-bromo-3:6-dioxo-1:2:3:6-tetrahydropyridazine used as starting material may be prepared as follows:

26 grams of 1-phenyl-2-methyl-4:5-dibromo-3:6-dioxo-1:2:3:4:5:6-tetrahydropyridazine are heated in 250 cc. of chloroform with 11.4 grams of pyridine at the boil for 6 hours. The pale yellow solution is washed with 2 N-hydrochloric acid, dried and evaporated. The crystalline residue is recrystallized from a mixture of benzene and petroleum ether. There is obtained 1-phenyl-2-methyl-5-bromo-3:6-dioxo-1:2:3:6 - tetrahydropyridazine of the formula

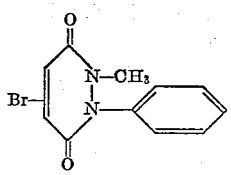

in the form of slightly yellow crystals melting at 159–161° C.

Example 4

10 grams of 1-phenyl-2-methyl-4:5-dibromo-3:6-dioxo-1:2:3:4:5:6-hexahydropyridazine are dissolved in 50 cc. of chloroform, and a solution of 4.7 grams of piperidine in 20 cc. of chloroform is added. The reaction is slightly exothermic. After allowing the chloroform solution to stand for about 12 hours it is washed with dilute hydrochloric acid, dried and evaporated. The crystalline residue is recrystallized from absolute ethanol. There is obtained 1-phenyl - 2 - methyl-4-piperidino-3:6-dioxo-1:2:3:6-tetrahydropyridazine of the formula

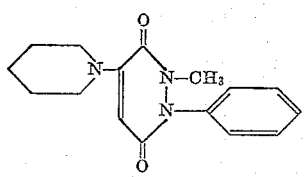

in the form of white crystals melting at 184–185° C.

Example 5

10 grams of 1-phenyl-2-methyl-5-bromo-3:6-dioxo-1:2:3:6-tetrahydropyridazine in 50 cc. of ethanol are heated with 50 cc. of an ethanolic solution of dimethylamine of 25% strength in a tube for 6 hours at 100–110° C. The solvent is completely evaporated from the dark solution, water is added to the residue, and the mixture is agitated with chloroform. The chloroform solution is dried over sodium sulfate, the chloroform is completely evaporated and the dark residue is extracted at the boil with ether, and recrystallized from a mixture of ether and petroleum ether or a mixture of benzene and petroleum ether. There is obtained 1-phenyl-2-methyl-4-dimethylamino-3:6-dioxo-1:2:3:6-tetrahydro-pyridazine of the formula

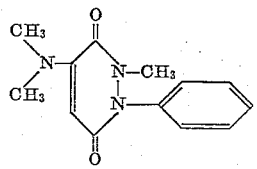

in the form of white lamellae melting at 74.5–75.5° C.

Example 6

14 grams of 1-phenyl-2-methyl-5-bromo-3:6-dioxo-1:2:3:6-tetrahydropyridazine are dissolved in 350 cc. of benzene, and a solution of 7.3 grams of pyrrolidine in 20 cc. of benzene is added dropwise at 30° C. in the course of ½ hour, while stirring. The whole is then stirred overnight (12 hours) at room temperature. The yellow benzene solution is washed with 1 N-hydrochloric acid and water, and the benzene is then distilled off in vacuo. The yellow crystalline residue is recrystallized from a mixture of acetone and petroleum ether. The resulting 1-phenyl - 2 - methyl - 4 - pyrrolidino-3:6-dioxo-1:2:3:6-tetrahydro-pyridazine of the formula

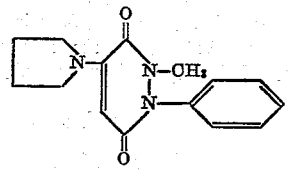

melts at 140.5–142° C.

Example 7

2.6 grams of 1-phenyl-2-methyl-4-chloro-3:6-dioxo-1:2:3:6-tetrahydropyridazine are heated in 50 cc. of absolute ethanol with 1.9 grams of morpholine for 5 hours at the boil. The ethanol is then distilled off, and the mixture is diluted with water. The solution is rendered acid with hydrochloric acid and extracted with chloroform. The dried organic phase is evaporated, and the residue is recrystallized from ethyl acetate. There is obtained the 1-phenyl-2-methyl-4-morpholino-3:6-dioxo-1:2:3:6-tetrahydropyridazine described in Example 1.

The 1 - phenyl - 2 - methyl-4-chloro-3:6-dioxo-1:2:3:6-tetrahydropyridazine may be prepared as follows:

10 grams of 1-phenyl-4-chloro-3:6-dioxo-1:2:3:6-tetrahydropyridazine are heated with 25 cc. of dimethyl sulfate for 3½ hours at 140–150° C. The brown solution is cooled and poured into 150 cc. of a saturated solution of sodium carbonate, and the whole is diluted with 100 cc. of water. The solution is stirred for a little time, and then extracted with chloroform. The chloroform extract solution is dried and evaporated. The residue is dissolved in benzene, and the solution is filtered through aluminum oxide and evaporated. The residue is crystallized from ethyl acetate. There is obtained 1-phenyl-2-methyl-4-chloro - 3:6 - dioxo-1:2:3:6-tetrahydropyridazine of the formula

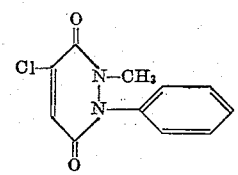

in the form of slightly yellow crystals melting at 150–152° C.

Example 8

39.4 cc. of a solution of 17.5% strength of dimethylamine in benzene are added dropwise at room temperature to 15 grams of 1-phenyl-2-ethyl-5-bromo-3:6-dioxo-1:2:3:6-tetrahydropyridazine in 300 cc. of benzene, while stirring. The reaction temperature rises from 18° C. to 34° C. A small amount of dimethylamine hydrobromide crystallizes out. After stirring the benzene solution for several hours, it is washed twice with 40 cc. of dilute hydrochloric acid and with 40 cc. of water. The benzene solution is dried, the solvent is completely evaporated therefrom, and the pale yellow oil is distilled in a bulb tube. There is obtained 1-phenyl-2-ethyl-4-dimethylamino-3:6-dioxo-1:2:3:6-tetrahydropyridazine in the form of a slightly yellow oil boiling at 180–185° C. under 0.06 mm. pressure. The starting material is obtained as follows:

47 cc. of a molar solution of bromine in glacial acetic acid are added to 10 grams of 1-phenyl-2-ethyl-3:6-dioxo-1:2:3:6-tetrahydropyridazine. The mixture is heated at the boil for a short time, during which it loses its color. The mixture is cooled, whereupon the brominated product crystallizes out. For the purpose of purification 1 - phenyl - 2 - ethyl-4:5-dibromo-3:6-dioxo-1:2:3:4:5:6- hexahydropyridazine is recrystallized from absolute ethanol and melts at 176–177° with decomposition. 23.6 grams of the latter product are heated at the boil in 200 cc. of chloroform with 10 grams of pyridine for 6 hours. The pale yellow chloroform solution is washed with dilute hydrochloric acid, dried and evaporated. The crystalline residue is recrystallized from a mixture of benzene and petroleum ether. There is obtained 1-phenyl-2 - ethyl-5-bromo-3:6-dioxo-1:2:3:6-tetrahydropyridazine in the form of faintly yellow crystals melting at 142–144° C.

*Example 9*

6.9 grams of pyrrolidine in 50 cc. of benzene are added dropwise at room temperature to 15 grams of 1-phenyl-2-ethyl-5-bromo-3:6-dioxo-1:2:3:6-tetrahydropyridazine in 300 cc. of benzene, while stirring. The reaction temperature rises from 24° C. to 30° C. After stirring the benzene solution for several hours, it is washed first with dilute hydrochloric acid, and then with dilute caustic soda solution and water. The benzene solution is dried and the solvent is completely evaporated therefrom, and the yellow oil is distilled in a bulb tube. It boils at 200° C. under 0.07 mm. pressure. The distillate is crystallized from a small amount of methanol. There is obtained 1-phenyl - 2 - ethyl-4-pyrrolidino-3:6-dioxo-1:2:3:6-tetrahydropyridazine of the formula

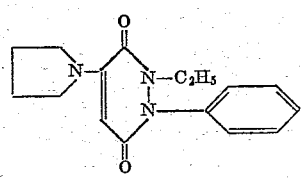

in the form of white crystals melting at 113–114° C.

*Example 10*

12.2 grams of morpholine in 50 cc. of benzene are added dropwise at room temperature to 15 grams of 1-phenyl - 2 - ethyl - 5 - bromo - 3:6 - dioxo - 1:2:3:6-tetrahydropyridazine in 300 cc. of benzene, while stirring. A small amount of morpholine hydrobromide precipitates. After stirring the benzene solution for several hours, it is washed with dilute hydrochloric acid and with water. The benzene solution is dried and the solvent is completely evaporated therefrom, and the thickly liquid residue is distilled in a bulb tube. It boils at 195–200° C. under 0.04 mm. pressure. The distillate is crystallized from ether. There is obtained 1-phenyl-2-ethyl-4-morpholino - 3:6 - dioxo - 1:2:3:6 - tetrahydropyridazine of the formula

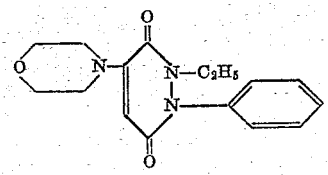

in crystalline form melting at 120–121° C.

*Example 11*

7.1 grams of cyclohexylamine in 50 cc. of benzene are added dropwise at room temperature to 10 grams of 1-phenyl - 2 - methyl - 5 - bromo - 3:6 - dioxo - 1:2:3:6-tetrahydropyridazine in 200 cc. of benzene, while stirring. When the addition of the amine is complete, the mixture is heated for a short time at 45–50° C. After stirring the benzene solution for several hours, it is washed first with dilute hydrochloric acid and then with water. The benzene solution is dried and the solvent is completely evaporated therefrom, during which the residue crystallizes. The latter is recrystallized from absolute ethanol.

There is obtained 1-phenyl-2-methyl-4-cyclohexylamino-3:6-dioxo-1:2:3:6-tetrahydropyridazine of the formula

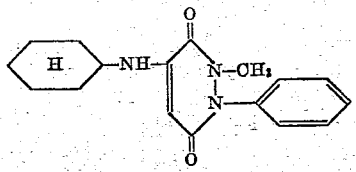

in the form of white crystals melting at 184–186° C.

*Example 12*

10 grams of 1-phenyl-2-methyl-5-bromo-3:6-dioxo-1:2:3:6-tetrahydropyridazine in 150 cc. of benzene are heated with 9.2 grams of tetrahydrofurfuryl-ethylamine in a tube for 6 hours at 130–140° C. The colored benzene solution is first washed with dilute hydrochloric acid and then with water. The solution is dried, the solvent is completely evaporated, and the residue is distilled under a high vacuum. There is obtained 1-phenyl-2-methyl-4-(tetrahydrofurfuryl - ethylamino) - 3:6 - dioxo - 1:2:3:6-tetrahydropyridazine of the formula

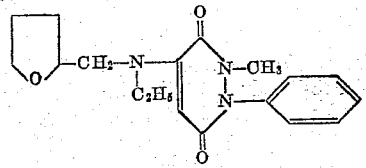

in the form of a thickly liquid oil boiling at 218–222° C. under 0.15 mm. pressure.

*Example 13*

14 grams of 1-phenyl-2-methyl-5-bromo-3:6-dioxo-1:2:3:6-tetrahydropyridazine are reacted in the manner described in Example 6 with 10 grams of N-methyl-piperazine. The mixture is stirred overnight, an excess of a saturated solution of potassium carbonate is added, and the benzene layer is separated and washed three times with a saturated solution of sodium chloride. After drying the benzene solution with solid potassium carbonate, the benzene is distilled off in vacuo, and the residue is distilled in a bulb tube at a bath temperature of 210–225° C. under 0.09 mm. pressure. There is obtained a viscous yellow oil, which is crystallized from a mixture of acetone and petroleum ether to yield 1-phenyl-2-methyl - 4 - (N' - methyl - piperazino) - 3:6 - dioxo - 1:2:3:6-tetrahydropyridazine of the formula

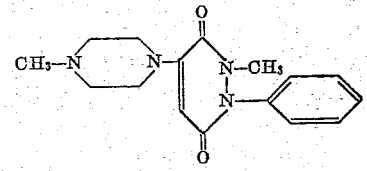

in the form of yellowish water-soluble crystals melting at 137.5–138° C.

*Example 14*

9 grams of the 1-phenyl-2-methyl-4-(N'-methyl-piperazino) - 3:6 - dioxo - 1:2:3:6 - tetrahydropyridazine described in Example 16 are dissolved in 50 cc. of warm acetone, and 5 cc. of methyl iodide are added. After heating the mixture on a water bath for one hour, the acetone is decanted from the precipitate and the latter is recrystallized from ethanol of 95% strength. The resulting 1-phenyl-2-methyl-4-(N'-methylpiperazino)-3:6-dioxo-1:2:3:6-tetrahydropyridazine methiodide of the formula

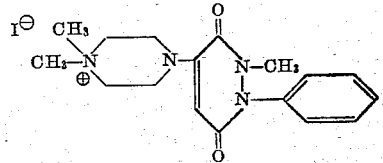

forms yellowish prisms melting at 275–277° C.

Example 15

14 grams of 1-phenyl-2-methyl-5-bromo-3:6-dioxo-1:2:3:6-tetrahydropyridazine are reacted in the manner described in Example 6 with 11 grams of hexa-methylene-imine. After working up in the manner described in Example 6, the crude product is recrystallized from a mixture of acetone and petroleum ether. The resulting 1-phenyl - 2 - methyl - 4 - hexamethylene - imino-3:6-dioxo-1:2:3:6-tetrahydropyridazine of the formula

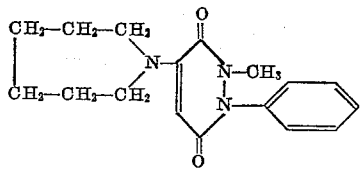

forms yellowish lamellae melting at 129.5–130° C.

Example 16

14 grams of 1-phenyl-2-methyl-5-bromo-3:6-dioxo-1:2:3:6-tetrahydropyridazine are reacted in the manner described in Example 6 with 11.6 grams of β-diethyl-amino-ethylamine. The oily 1-phenyl-2-methyl-4-(β-diethylamino-ethylamino) - 3:6 - dioxo - 1:2:3:6-tetrahydropyridazine of the formula

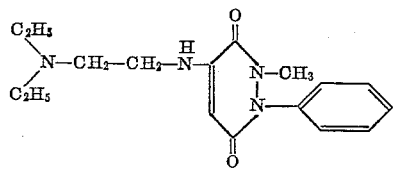

is purified by distillation in a bulb tube at a bath temperature of 180° C. under 0.17 mm. pressure, and is converted into its hydrochloride in the usual manner. The hydrochloride crystallises from absolute ethanol in the form of almost colorless crystals melting at 229–230° C. Other salts can also be prepared in the usual manner such as the sulfate, nitrate, methane sulfonate or tartarate.

Example 17

14 grams of 1-phenyl-2-methyl-5-bromo-3:6-dioxo-1:2:3:6-tetrahydropyridazine are reacted in solution in benzene in the manner described in Example 6 with 13 grams of N-(β-hydroxyethyl)-piperazine. After stirring the mixture overnight, the benzene is distilled off, the residue is dissolved in as small a quantity of water as possible, and the solution is saturated with potassium carbonate and extracted with chloroform several times. The chloroform extracts are united, then dried with potassium carbonate, and the chloroform is distilled off. The viscous oil which remains behind is dissolved in boiling acetone and the solution is diluted with ether. There is obtained 1-phenyl-2-methyl-4[N'-(β-hydroxyethyl)-piperazino]-3:6-dioxo - 1:2:3:6 - tetrahydropyridazine of the formula

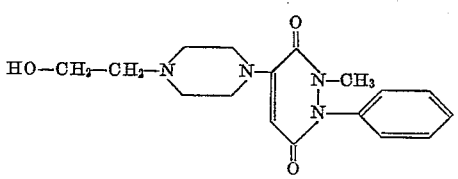

in the form of colorless crystals melting at 136.5–137.5° C.

Example 18

14 grams of 1-phenyl-2-methyl-5-bromo-3:6-dioxo-1:2:3:6-tetrahydropyridazine are reacted in the manner described in Example 6 with 12 grams of N:N-dimethyl-N'-ethyl-ethylene diamine. By working up as described in Example 6 there is obtained a yellow oil, which is purified by distillation in a bulb tube and then recrystallized from a mixture of acetone and ether. The resulting 1 - phenyl - 2 - methyl-4-[N-(β-dimethyl-amino-ethyl)-N-ethyl-amino]-3:6-dioxo-1:2:3:6-tetrahydropyridazine of the formula

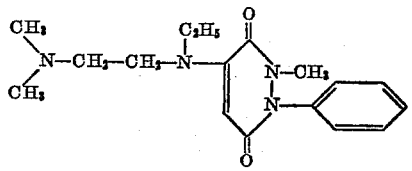

forms yellowish crystals melting at 88–88.5° C.

Example 19

14 grams of 1-phenyl-2-methyl-5-bromo-3:6-dioxo-1:2:3:6-tetrahydropyridazine in solution in benzene are reacted in the manner described in Example 6 with 6 grams of N-methyl-etholamine. After working up as described in Example 17, the residue from the chloroform solution is recrystallized from a mixture of acetone and ether. There is obtained 1-phenyl-2-methyl-4-[N-(β-hydroxyethyl) - N-methyl-aminol]-3:6-dioxo-1:2:3:6-tetrahydropyridazine of the formula

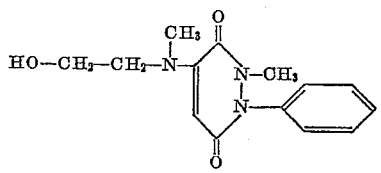

in the form of slightly yellowish lamellae melting at 103–104° C.

Example 20

10.5 grams of 1-para-chlorophenyl-2-methyl-5-bromo-3:6-dioxo-1:2:3:6-tetrahydropyridazine are dissolved in 300 cc. of benzene, and a solution of 4.4 grams of dimethylamine in 40 cc. of benzene is added dropwise at room temperature while stirring. After stirring the benzene solution overnight at room temperature it is washed with water, dried, the benzene is distilled off in vacuo, and the residue is recrystallized from a mixture of acetone and ether. The resulting 1-para-chlorophenyl-2-methyl-4 - dimethylamino - 3:6-dioxo-1:2:3:6-tetrahydropyridazine of the formula

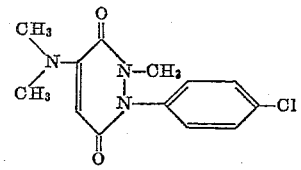

forms yellowish prisms melting at 159.5–160.5° C.

The 1-para-chlorophenyl-2-methyl-5-bromo-3:6-dioxo-1:2:3:6-tetrahydropyridazine can be prepared as follows:

100 grams of 1-para-chlorophenyl-3-hydroxy-pyridazine-(6)- are rapidly heated to 190–200° C. with 100 cc. of dimethylsulfate in an oil bath preheated to 150° C. The pyridazone dissolves slowly. When the boiling point is reached, the mixture boils spontaneously for a short time without the external heating. When the reaction has decreased, the mixture is allowed to cool for 15 minutes, and then the mixture is stirred into 750 cc. of a saturated solution of sodium carbonate and 750 cc. of water. After stirring the mixture overnight at room temperature, the excess of dimethylsulfate is hydrolyzed. The solution is extracted with chloroform, the chloroform extract solution is washed with dilute caustic soda solution and water, dried and evaporated. The residue is recrystallized from methanol. The resulting 1-parachlorophenyl - 2 - methyl - 3:6-dioxo-1:2:3:6-tetrahydropyridazine of the formula

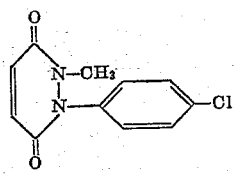

forms dense prisms melting at 145–146° C.

23.65 grams of 1-para-chlorophenyl-2-methyl-3:6-dioxo-1:2:3:6-tetrahydropyridazine are dissolved in 30 cc. of warm glacial acetic acid, and 100 cc. of a 1-molar solution of bromine in glacial acetic acid are added. The solution is heated to the boil for a short time, during which decolorisation occurs. After cooling the mixture and allowing it to stand overnight, the product which crystallizes out is filtered off with suction, washed with a small amount of methanol and dried. The resulting 1 - para - chlorophenyl - 2-methyl-4:5-dibromo-3:6-dioxo-1:2:3:4:5:6-hexahydropyridazine of the formula

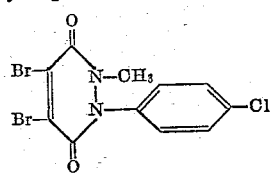

forms colorless crystals melting at 178° C. From the glacial acetic acid mother liquor a further small amount of the same product can be obtained by dilution with water.

21.5 grams of the dibromo-derivative so obtained are boiled in 200 cc. of chloroform with 9 grams of pure pyridine for 6 hours under reflux. The chloroform solution is then washed with dilute hydrochloric acid and water, dried, evaporated, and the residue is recrystallized from methanol. The resulting 1-para-chlorophenyl-2-methyl - 5-bromo-3:6-dioxo-1:2:3:6-tetrahydropyridazine of the formula

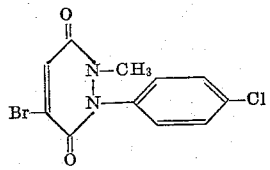

forms yellows prisms melting at 158.5–159° C.

*Example 21*

10.5 grams of 1-para-chlorophenyl-2-methyl-5-bromo-3:6-dioxo-1:2:3:6-tetrahydropyridazine are dissolved in 300 cc. of benzene and reacted at room temperature in the manner described in Example 6 with 5 grams of pyrrolidine. After working up as described in Example 6, the crude product is recrystallized from acetone. The resulting 1-para-chloro-phenyl-2-methyl-4-pyrrolidino-3:6-dioxo-1:2:3:6-tetrahydro-pyridazine of the formula

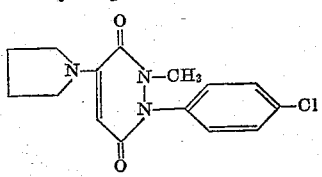

forms yellowish lamellae melting at 187.5–188.5° C.

*Example 22*

10.2 grams of 1-m-chlorophenyl-2-methyl-5-bromo-3:6-dioxo-1:2:3:6-tetrahydropyridazine are dissolved in 300 cc. of benzene and a solution of 4.3 grams of dimethylamine in 40 cc. of benzene is added dropwise at room temperature and with stirring in the course of ½ hour. After being stirred overnight at room temperature, the benzene solution is washed with water, dried with sodium sulfate and evaporated. The remaining oil is distilled in a bulb tube at 200° C. bath temperature under 0.05 mm. pressure of mercury, and the viscous pale yellow oil crystallizes from ether. 1-m-chloro-phenyl-2-methyl-4-dimethylamino-3:6-dioxo-1:2:3:6-tetrahydropyridazine of the formula

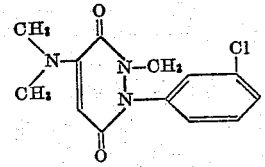

forms colorless crystals melting at 102–103° C.

The 1 - m - chlorophenyl-2-methyl-5-bromo-3:6-dioxo-1:2:3:6-tetrahydropyridazine used as starting material can be prepared as follows:

273 grams of m-chloro-phenyl-hydrazine sulfate are boiled with stirring and under reflux with 1.7 liters of water, 180 cc. of concentrated hydrochloric acid ($d=1.19$) and 98 grams of maleic acid anhydride for 2 hours. After cooling, the crystallisate is filtered with suction, washed with water and, for the purpose of purification, dissolved in 700 cc. of 2 N-caustic soda solution. The alkaline solution is filtered over Celite with active charcoal and the reaction product is then precipitated by adding 5 N-hydrochloric acid dropwise with stirring. The colorless 1-m-chlorophenyl-3-hydroxy-pyridazone-(6) is filtered with suction, washed neutral with water and dried in vacuo at 110° C. It melts at 247–248° C.

111.25 grams of 1-m-chlorophenyl-3-hydroxy-pyridazone-(6) are stirred with 150 cc. of dimethyl sulfate for 4 hours at 150–155° C. bath temperature. After cooling, the mixture is stirred with 850 cc. of saturated sodium carbonate solution and 750 cc. of water overnight at room temperature. The homogeneous solution is extracted with ether 4 times to remove any O-methyl derivative.

The solution is then extracted 4 times with chloroform. After distilling off the chloroform, the crystalline residue is recrystallized from methanol. 1-m-chlorophenyl-2-methyl-3:6-dioxo-1:2:3:6-tetrahydropyridazine melts at 141–142° C.

69.4 grams of 1-m-chlorophenyl-2-methyl-3:6-dioxo-1:2:3:6-tetrahydropyridazine are dissolved in 100 cc. of warm glacial acetic acid, and 294 cc. of a 1-molar solution of bromine in glacial acetic acid are added. The mixture is boiled for a short time, the bromine being rapidly consumed. The mixture is then poured on to ice, the precipitated dibromo-derivative is filtered with suction, washed with water, dissolved in chloroform, the solution washed with water, dried with sodium sulfate and diluted to 400 cc. with chloroform. After the addition of 47 cc. of pure pyridine the mixture is boiled under reflux for 6 hours, the chloroform solution washed with dilute hydrochloric acid and water, dried and evaporated. The residue is recrystallized from methanol. 1-m-chlorophenyl-2-methyl-5-bromo-3:6-dioxo-1:2:3:6 - tetrahydropyridazine of the formula

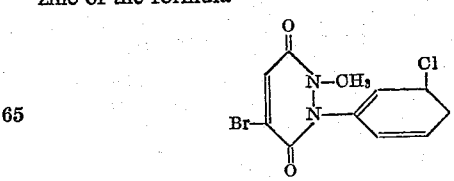

melts at 169–170° C.

*Example 23*

9.83 grams of 1-para-tolyl-2-methyl-5-bromo-3:6-dioxo-1:2:3:6-tetrahydropyridazine are dissolved in 300 cc. of benzene and reacted with dimethylamine and worked up as described in Example 22. The crude product is purified by distillation in a bulb tube at 190° C. bath temperature under 0.06 mm. pressure of mercury, and then recrystallized from a mixture of acetone and hexane. 1-para-tolyl-2-methyl-4-dimethylamino-3:6 - dioxo-1:2:3:6-tetrahydropyridazine of the formula

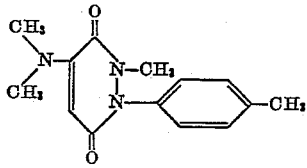

forms yellowish prisms melting at 143–144° C.

The 1 - para-tolyl-2-methyl-5-bromo-3:6-dioxo-1:2:3:6-tetrahydropyridazine used as starting material is prepared as follows:

171 grams of para-tolyl-hydrazine sulfate are boiled under reflux with 1.7 liters of water, 180 cc. of concentrated hydrochloric acid and 98 grams of maleic acid anhydride for 2 hours with stirring. After cooling, the mixture is filtered with suction, the crystallisate purified by being dissolved in dilute caustic soda solution, the solution filtered with charcoal and precipitated with 5 N-hydrochloric acid. 1-paratolyl-3-hydroxy-pyridazone-(6) melts at 230° C. 101 grams of 1-para-tolyl-3-hydroxy-pyridazone-(6) are stirred with 150 cc. of dimethyl sulfate for 5 hours at 145–150° C. The mixture is hydrolyzed overnight with excess dilute sodium carbonate solution. After extraction with ether to remove any by-products, 1-paratolyl-2-methyl 3:6-dioxo-1:2:3:6-tetrahydropyridazine is extracted with chloroform and crystallizes from a mixture of acetone and ether in the form of pale yellow crystals melting at 132–134° C.

21.6 grams of the above product are dissolved in 20 cc. of hot glacial acetic acid, and 100 cc. of a 1-molar solution of bromine and glacial acetic acid are added. After being boiled for a short time, the solution loses its color. It is poured hot on to ice, the precipitating 1-para-tolyl-2-methyl-3:6-dioxo-1:2:3:4:5:6 - hexahydropyridazine is filtered with suction, washed with water, dissolved in chloroform, the solution (350 cc.) dried and after the addition of 16 cc. of pure pyridine the mixture is boiled under reflux for 6 hours. The chloroform solution is then washed neutral with dilute hydrochloric acid and water, dried, evaporated and the residue is recrystallized from methanol. 1-para-tolyl - 2 - methyl-5-bromo-3:6-dioxo-1:2:3:6-tetrahydropyridazine of the formula

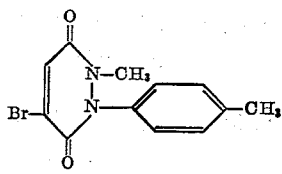

forms pale yellow prisms melting at 170–171° C.

Example 24

8.65 grams of piperidine in 30 cc. of benzene are added dropwise to 15 grams of 1-phenyl-2-ethyl-5-bromo-3:6-dioxo-1:2:3:6-tetrahydropyridazine in 200 cc. of benzene with stirring at room temperature. A slight increase in temperature takes place and piperidine-hydrobromide is precipitated. After stirring for several hours, the solution is washed with dilute hydrochloric acid, dilute caustic soda solution and water. The dried benzene solution is completely evaporated and the brown viscous residue distilled in a bulb tube (boiling point=200° C. under 0.05 mm. of pressure). The distillate is crystallized from hexane or petroleum ether. 1-phenyl-2-ethyl-4-piperidino-3:6-dioxo-1:2:3:6-tetrahydropyridazine of the formula

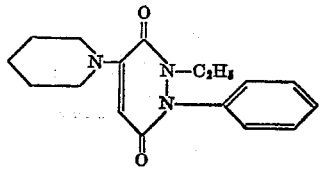

melting at 78–79° C. is obtained.

Example 25

58 cc. of 7.9% solution of ethylamine in benzene are added dropwise to 10 grams of 1-phenyl-2-ethyl-5-bromo-3:6-dioxo-1:2:3:6-tetrahydropyridazine in 200 cc. of benzene with stirring at room temperature. The reaction temperature rises to 32° C. and ethylamine-hydrobromide precipitates. After stirring for several hours, the benzene solution is washed with dilute hydrochloric acid and water. The dry benzene solution is completely evaporated and the crystalline residue is recrystallized from a mixture of benzene and petroleum ether. 1-phenyl - 2 - ethyl - 4 - ethylamino-3:6-dioxo-1:2:3:6-tetrahydropyridazine of the formula

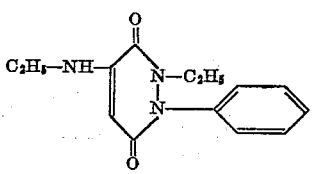

melting at 130–132° C. is obtained.

Example 26

6.25 grams of n-butylamine in benzene are added dropwise to 12 grams of 1-phenyl-2-methyl-5-bromo-3:6-dioxo-1:2:3:6-tetrahydropyridazine in 250 cc. of benzene at room temperature. The reaction temperature rises to 30° C. and n-butylamine-hydrobromide precipitates. After stirring for several hours, the benzene solution is washed with dilute hydrochloric acid and water. The dry benzene solution is completely evaporated and the crystalline residue recrystallized from a mixture of benzene and petroleum ether. There is obtained 1-phenyl-2-methyl-4-n-butylamino-3:6-dioxo-1:2:3:6-tetrahydropyridazine of the formula

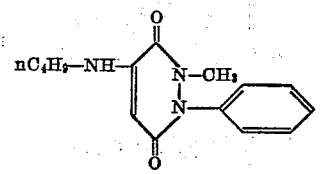

melting at 130–131° C.

Example 27

21.4 cc. of a 17% solution of ammonia in methanol are added to 5 grams of 1 - phenyl - 2 - methyl-5-bromo-3:6-dioxo-1:2:3:6-tetrahydropyridazine with stirring at room temperature. The starting material dissolves slowly and a white product begins to crystallize which is filtered off after three hours. The filtrate is evaporated in vacuo at room temperature and water is added to the residue. The mixture is rendered alkaline with sodium carbonate, the alkaline solution is extracted with chloroform, the organic phase dried, completely evaporated, and the residue recrystallized several times from methanol. There is obtained 1 - phenyl - 2 - methyl-4-amino-3:6-dioxo-1:2:3:6-tetrahydropyridazine of the formula

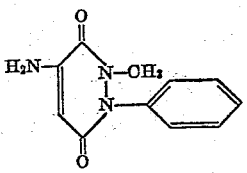

in the form of slightly yellow crystals melting at 192–194° C.

Example 28

34 cc. of a 17.5% solution of dimethyl-amine in benzene are added dropwise to 15.0 grams of 1-para-nitrophenyl-2-ethyl-5-bromo-3:6-dioxo-1:2:3:6 - tetrahydropyridazine in 500 cc. of benzene with stirring at room temperature. The reaction temperature increases to 30° C. and dimethylamine-hydrobromide precipitates. After stirring for several hours, the benzene solution is washed with dilute hydrochloric acid, dilute caustic soda solution and water. The dried organic phase is completely evaporated and the residue recrystallized from a mixture of ethyl acetate and petroleum ether. There is obtained 1-p-nitrophenyl - 2 - ethyl - 4 - dimethylamino-3:6-dioxo-1:2:3:6-tetrahydropyridazine of the formula

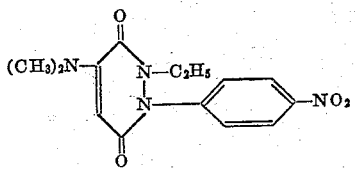

melting at 163–165° C.

The 1-para-nitrophenyl - 2 - ethyl-5-bromo-3:6-dioxo-1:2:3:6-tetrahydropyridazine used as starting material can be obtained as follows:

30.5 grams of 1-para-nitrophenyl-2-ethyl-4:5-dibromo-3:6-dioxo-1:2:3:4:5:6-hexahydropyridazine are heated at the boil in 350 cc. of chloroform with 11.5 grams of pyridine for 6 hours. The chloroform solution is washed with 80 cc. of dilute hydrochloric acid and 80 cc. of water, dried and completely evaporated. The crystalline residue is recrystallized from ethyl acetate. There is obtained 1-paranitrophenyl-2-ethyl - 5 - bromo - 3:6 - dioxo-1:2:3:6-tetrahydropyridazine of the formula

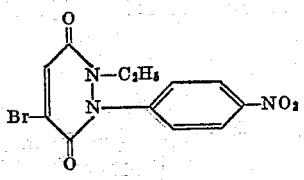

in the form of faintly yellow crystals melting at 199–201° C.

The 1-para-nitrophenyl-2-ethyl-4:5-dibromo-3:6-dioxo-1:2:3:4:5:6-hexahydropyridazine used can be prepared as follows:

30 cc. of nitric acid ($d=1.4$) are added dropwise with stirring to 27.8 grams of 1-phenyl-2-ethyl-3:6-dioxo-1:2:3:6-tetrahydropyridazine in 60 cc. of concentrated sulfuric acid at a temperature between 15 and 25° C. The solution is cooled, stirred first for two hours at 5–10° C. and then for another two hours at room temperature, then poured on to 800 cc. of ice water and after some hours extracted four times with chloroform. The chloroform solution is washed with water, dried and completely evaporated. The crystalline residue is recrystallized from benzene and a mixture of benzene and petroleum ether. There is obtained 1-para-nitrophenyl-2 - ethyl - 3:6-dioxo - 1:2:3:6-tetrahydropyridazine of the formula

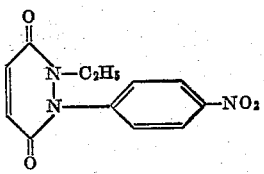

in crystalline form melting at 179–181° C.

66 cc. of a molar solution of bromine in glacial acetic acid are added to 17.2 grams of 1-para-nitro-phenyl-2-ethyl-3:6-dioxo-1:2:3:6-tetrahydropyridazine. The mixture is heated to the boil for a short time, whereupon it loses its color within a few minutes. The solution is cooled, and the brominated product crystallizes out. It is recrystallized from absolute ethanol for the purpose of purification. There is obtained 1-para-nitrophenyl-2-ethyl-4:5-dibromo-3:6-dioxo - 1:2:3:4:5:6 - hexahydropyridazine of the formula

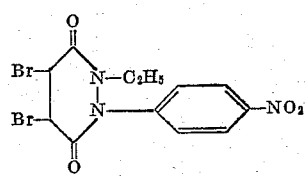

in crystalline form melting at 150–152° C.

The 1 - para-nitrophenyl-2-ethyl-4-dimethyl-amino-3:6-dioxo-1:2:3:6-tetrahydropyridazine obtained can be reduced to the corresponding para-aminophenyl compound as follows:

6.1 grams of 1-para-nitrophenyl-2-ethyl-4-dimethyl-amino-3:6-dioxo-1:2:3:6-tetrahydropyridazine in 300 cc. of ethyl acetate are catalytically hydrogenated in the presence of 2 grams of Raney nickel at 25° C. After about 6 hours, the theoretical quantity of hydrogen (1.35 liters) is taken up. The solution is filtered, evaporated to 50 cc. and cooled. The crystalline residue is filtered with suction and recrystallized from a mixture of ethyl acetate, ethanol and petroleum ether. There is obtained 1-para-aminophenyl-2-ethyl - 4 - dimethyl - amino - 3:6 - dioxo-1:2:3:6-tetrahydropyridazine of the formula

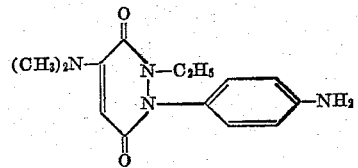

in crystalline form melting at 167–169° C.

Example 29

5.4 grams of 1-para-nitrophenyl-2-methyl-4-bromo-3:6-dioxo-1:2:3:6-tetrahydro-pyridazine in 100 cc. of benzene are heated in a tube with 25 cc. of a solution of 23% strength of dimethylamine in benzene for 6 hours at 100–110° C. The mixture is evaporated, mixed with water and extracted with chloroform. The dry chloroform solution is completely evaporated and the residue is recrystallized several times from methanol. There is obtained 1 - para-nitrophenyl-2-methyl-4-dimethyl-amino-3:6-dioxo-1:2:3:6-tetrahydropyridazine of the formula

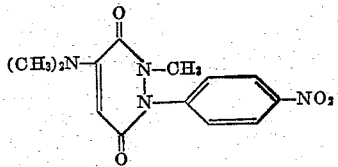

melting at 175–177° C.

The starting material can be prepared as follows:

100 cc. of nitric acid ($d=1.4$) are added dropwise with stirring to 100 grams of 1-phenyl-2-methyl-3:6-dioxo-1:2:3:6-tetrahydropyridazine in 200 cc. of concentrated sulfuric acid at a temperature between 15 and 25° C. The mixture is stirred for 2 hours at 5 to 10° C. and for another three hours at room temperature, a slight increase in temperature (30° C.) being perceptible. The solution is poured on to 2.5 liters of ice water, stirred for 8 hours and extracted several times with chloroform. The chloroform solution is first washed neutral, dried and completely evaporated. The crystalline residue is recrystallized from ethyl acetate. There is obtained 1-para-nitrophenyl-2-methyl-3:6-dioxo - 1:2:3:6 - tetrahydropyridazine in the form of faintly yellow crystals melting at 185–186° C.

10 grams of 1-para-nitrophenyl-2-methyl-3:6-dioxo-1:2:3:6-tetrahydropyridazine are dissolved in 30 cc. of glacial acetic acid with heating, and 65 cc. of a molar solution of bromine in glacial acetic acid are added and the mixture heated to the boil for 10 minutes, the solution partially losing its color. After two hours the mixture is cooled, the crystalline product is filtered with suction and water added to the filtrate, whereby another portion crystallizes out. The crystallisate is recrystallized from absolute ethanol. There is obtained 1-para-nitrophenyl-2-methyl-4:5-dibromo - 3:6 - dioxo - 1:2:3:4:5:6-hexahydropyridazine in white crystalline form melting at 183.5–184.5° C.

16 grams of 1-para-nitrophenyl-2-methyl-4:5-dibromo-3:6-dioxo-1:2:3:4:5:6-hexahydropyridazine are heated at the boil for 6 hours in 150 cc. of chloroform and 6.2 grams of pyridine. The cooled chloroform solution is washed with 100 cc. of dilute hydrochloric acid and water, dried and completely evaporated. The crystalline residue is recrystallized from a mixture of benzene and petroleum ether. There is obtained 1-para-nitrophenyl-2-methyl-5-bromo-3:6-dioxo-1:2:3:6-tetrahydropyridazine in the form of slightly yellow crystals melting at 199–201° C.

From the mother liquor of crystallization a second product is isolated which can be recrystallized from a mixture of glacial acetic acid and water. There is obtained as by-product 1-para-nitrophenyl-2-methyl-4-bromo-3:6-dioxo - 1:2:3:6 - tetrahydropyridazine melting at 216–218° C.

What is claimed is:

1. A compound of the formula:

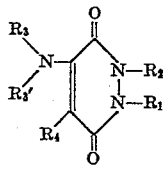

wherein $R_1$ is a member selected from the group consisting of phenyl, lower alkyl-phenyl, lower alkoxy-phenyl, halogeno-phenyl, nitro-phenyl and $NH_2$-phenyl, $R_2$ represents lower alkyl, $R_3$ and $R_3'$ are members selected from the group consisting of hydrogen, lower alkyl, cyclopentyl, cyclohexyl, di - lower alkyl-amino lower-alkyl, hydroxy-lower alkyl, and, taken together, pyrrolidino, piperidino, morpholino and piperazino and $R_4$ stands for a member selected from the group consisting of hydrogen and lower alkyl.

2. Compounds of the formula:

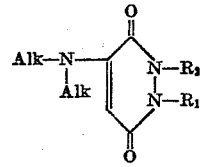

wherein $R_1$ is phenyl, $R_2$ lower alkyl and "Alk" stands for lower alkyl.

3. Compounds of the formula:

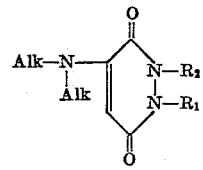

wherein $R_1$ represents lower alkylphenyl, $R_2$ halogeno and "Alk" stands for lower alkyl.

4. Compounds of the formula:

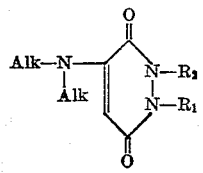

wherein $R_1$ represents lower alkyl-phenyl, $R_2$ lower alkyl and "Alk" stands for lower alkyl.

5. Therapeutically useful acid addition salts of the compounds of claim 1.

6. A member selected from the group consisting of quaternary lower alkyl ammonium compounds and quaternary benzyl ammonium compounds of the compounds of claim 1.

7. 1-phenyl-2-methyl-4 - dimethylamino-3:6-dioxo-1:2:3:6-tetrahydropyridazine.

8. 1 - para - chlorophenyl-2-methyl-4-dimethyl-amino-3:6-dioxo-1:2:3:6-tetrahydropyridazine.

9. 1-meta-chloro-phenyl-2 - methyl-4-dimethylamino-3:6-dioxo-1:2:3:6-tetrahydro-pyridazine.

10. 1 - phenyl - 2 - methyl-4-n-butylamino-3:6-dioxo-1:2:3:6-tetrahydropyridazine.

11. 1-phenyl-2-ethyl-4 - ethylamino-3:6-dioxo-1:2:3:6-tetrahydropyridazine.

References Cited in the file of this patent

UNITED STATES PATENTS 2,858,311    Steck _____ Oct. 28, 1958

OTHER REFERENCES

Druey et al.: Helvetica Chimica Acta, vol. 37, pages 528–529 (1954).

UNITED STATES PATENT OFFICE
CERTIFICATE OF CORRECTION

Patent No. 3,004,972                  October 17, 1961

Jean Druey et al.

It is hereby certified that error appears in the above numbered patent requiring correction and that the said Letters Patent should read as corrected below.

Column 1, line 42, for "-amonium" read -- -ammonium --; column 2, lines 24 and 25, for "-tetrahydropyrdiazines" read -- tetrahydropyridazines --; column 10, line 21, for "-etholamine" read -- -ethanolamine --; line 25, for "-aminol" read -- -amino --; column 11, lines 22 to 29, the formula should appear as shown below instead of as in the patent:

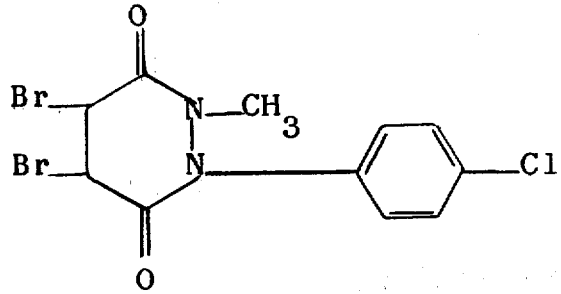

Signed and sealed this 24th day of July 1962.

(SEAL)
Attest:
ERNEST W. SWIDER
Attesting Officer

DAVID L. LADD
Commissioner of Patents